United States Patent Office
3,073,846
Patented Jan. 15, 1963

3,073,846
PREPARATION OF CYCLIC ALKYLENE
THIOCARBONATES
Allen F. Millikan, Crystal Lake, Ill., assignor to The Pure
Oil Company, Chicago, Ill., a corporation of Ohio
No Drawing. Filed Mar. 7, 1960, Ser. No. 12,935
11 Claims. (Cl. 260—327)

This invention relates to an improved process for the production of alkylene thiocarbonates by the reaction of oxirane compounds (such as alkylene oxides, including ethylene and propylene oxides), or thiirane compounds (such as ethylene and propylene sulfide for example) with carbon disulfide at elevated temperatures and pressures. More particularly, this invention relates to processes for the production of alkylene thiocarbonates from oxirane or thiirane compounds wherein a certain class of catalysts is employed for promoting the reaction.

Ethylene carbonate has been prepared from ethylene glycol by reaction with phosgene. The reaction of alcohols with phosgene produces the corresponding alkyl carbonate. Also, ethylene chlorohydrin, when reacted with alkali metal carbonates or bicarbonates, produces ethylene carbonate. Several research workers have suggested catalysts for the reaction of oxirane compounds with carbon dioxide. Such catalysts as sodium hydroxide on activated carbon, pyridine, and other amines have been included in this work. These prior art methods are deficient for a number of reasons, including the danger of explosions, poor yields, or contaminated products.

It is an object of this invention to provide a catalytic process for producing alkylene thiocarbonates by the reaction of oxirane or thiirane compounds with carbon disulfide, wherein the reaction is facilitated, product purity is improved, and yields are increased.

It is another object of this invention to provide a process for the preparation of alkylene thiocarbonates from oxirane compounds by catalytic reaction with carbon disulfide in the presence of organic "onium" compounds.

A further object of this invention is to provide a process for the production of alkylene thiocarbonates from alkylene oxides through reaction with carbon disulfide in the presence of a small amount of organic "onium" salts as catalyst.

Other objects and features of this invention will be apparent from the following description.

In accordance with this invention, the alkylene oxides and sulfides (thiiranes) which are reacted with carbon disulfide are those having the following general structural formula,

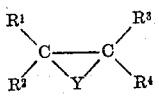

wherein $R^1$, $R^2$, $R^3$ and $R^4$ may be hydrogen, or the same or different hydrocarbyl groups containing from 1 to 20 carbon atoms, and in which any two of the groups $R^1$, $R^2$, $R^3$ and $R^4$ may be interconnected to form, with one or two of the carbon atoms shown in the formula, a carbocyclic ring, and Y is oxygen or sulfur. The reaction with carbon disulfide may be shown as follows:

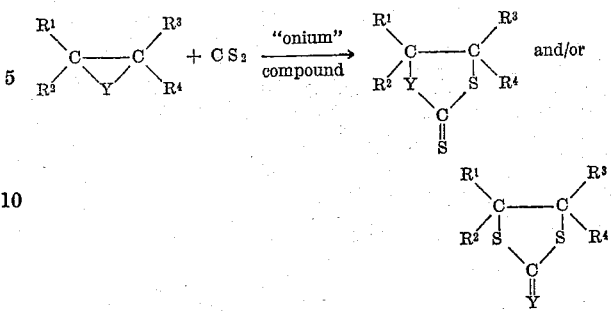

wherein $R^1$, $R^2$, $R^3$, $R^4$ and Y are as defined supra. The product in the above reaction may be described generally by the formula,

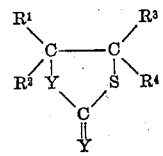

wherein $R^1$, $R^2$, $R^3$, and $R^4$ are selected from the group of hydrogen, the same or different hydrocarbyl groups containing 1 to 20 carbon atoms, and one Y is sulphur with the other being oxygen when an oxirane is an original reactant, and both being sulfur when a thiirane is an initial reactant.

The organic "onium" compounds effective as catalysts for this reaction are selected from the group of organic sulfonium, organic phosphonium and organic oxonium salts, e.g., urea salts and hydrocarbyl-substituted urea salts, i.e., hydrocarbyl-substituted urea compounds formed with hydrohalic acids.

The organic sulfonium salts used as catalysts have the general formula,

wherein $R^5$, $R^6$ and $R^7$ are the same or different hydrocarbyl radicals containing 1 to 20 carbon atoms, and X is a halogen, i.e., iodine, bromine, fluorine or chlorine.

Specific examples of catalysts for the reaction comprise the class of sulfonium salts coming under the above formula, and include trimethylsulfonium bromide, trimethylsulfonium chloride, trimethylsulfonium iodide, triethylsulfonium iodide, triethylsulfonium bromide, triethylsulfonium chloride, diethylmethylsulfonium bromide, diethylmethylsulfonium chloride, diethylmethylsulfonium iodide, tolyldimethylsulfonium bromide, tolyldimethylsulfonium chloride, triphenylsulfonium bromide and tolyldimethylsulfonium iodide. These sulfonium salts are crystalline solids or viscous oils at room temperatures and can be prepared by the alkylation of sulfides, or by other methods known in the art. It is known that hexacovalent sulfur compounds, such as alkali metal sulfonates, do not catalyze this reaction.

Organic phosphonium salts used as catalysts in accordance with this invention have the general formula,

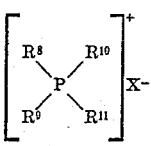

wherein $R^8$, $R^9$, $R^{10}$ and $R^{11}$ are the same or different hydrocarbyl radicals containing from 1 to 20 carbon atoms, and X is a halogen as previously defined.

Thus additional specific examples of catalysts for the reaction comprise the class of phosphonium salts coming under the above formula, and include tetramethylphosphonium bromide, diethyldiamylphosphonium iodide, tetraphenylphosphonium bromide, tri-n-propylbenzylphosphonium chloride, tri-3,5-xylyl-1-naphthylphosphonium bromide, etc. These phosphonium salts are crystalline solids or viscous oils at room temperature and can be prepared by the alkylation of phosphines or by other methods known in the art.

Urea and hydrochloric acid are considered to combine in the following manner:

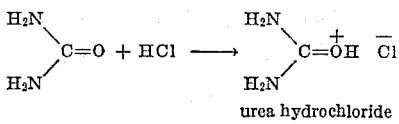

urea hydrochloride

Once formed, the cation resonates thus:

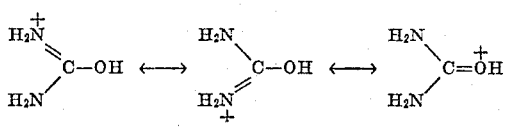

Urea hydrochloride thus is partially an oxonium salt, and is clearly distinguished from ammonium salts where the proton forms a covalent bond with nitrogen, thereby centering the positive charge about the nitrogen.

Neither urea nor hydrochloric acid by itself is an effective catalyst for the preparation of ethylene carbonate from ethylene oxide and carbon dioxide. When urea was used in an experiment comparable to one of the examples described below, there was only a 26% yield of crude product; when hydrochloric acid was tested as a catalyst in a comparable experiment, there was only a 7% yield of crude product; and in another comparable experiment with no catalyst, the yield was less than 5%.

However, urea salts formed with hydrohalic acids, that is, urea hydrochloride, urea hydrobromide, urea hydrofluoride and urea hydroiodide, are exceptionally effective catalysts for the preparation of alkylene thiocarbonates. In view of the indifferent ability of either urea or hydrochloric acid alone to act as a catalyst for this type of reaction, the effectiveness of this class of urea salts, e.g., urea hydrochloride, is considered to be even more remarkable.

The urea salts used in accordance with this invention include, in addition to the urea hydrohalides, the alkyl-, aryl-, alkaryl-, and aralkyl-substituted urea hydrohalides all coming within the general formula,

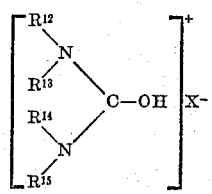

showing the cation and anion configuration, wherein $R^{12}$, $R^{13}$, $R^{14}$, and $R^{15}$ may be hydrogen, alkyl, aryl, aralkyl and alkaryl groups containing up to 10 carbon atoms, provided no more than one aryl or alkaryl group is present in the molecule, and X is a halogen as previously defined. Thus where $R^{12}$, $R^{13}$, $R^{14}$ and $R^{15}$ are hydrogen, the formula defines the unsubstituted urea hydrohalide salts aforementioned as being effective catalysts.

Where one R group in the formula aforementioned is an alkyl radical, and the balance, i.e., $R^{13}$, $R^{14}$ and $R^{15}$ are hydrogen, the formula covers the sub-genus of alkyl urea hydrohalides. Species thereunder include methylurea hydrochloride, methylurea hydrobromide, methylurea hydroiodide, methylurea hydrofluoride, ethylurea hydrochloride, ethylurea hydrobromide, ethylurea hydroiodide, ethylurea hydrofluoride, propylurea hydrochloride, butylurea hydrobromide, isobutylurea hydroiodide, pentylurea hydrofluoride, hexylurea hydrochloride, and octylurea hydroiodide.

In the general formula, the dialkyl-substituted urea hydrohalides, having two alkyl groups attached to one nitrogen atom, or an alkyl group attached to each nitrogen atom, would include N,N'-dimethylurea hydrobromide, N,N-dimethylurea hydroiodide, N,N'-methylethylurea hydrochloride, N,N-ethylpropylurea hydrofluoride, N,N'-propylbutylurea hydrobromide, N,N-dioctylurea hydrofluoride, N,N'-dinonylurea hydrochloride, and N,N'-didecylurea hydroiodide.

The following tri- and tetraalkyl-substituted urea hydrohalide salts are also species under the formula trimethylurea hydrobromide, triethylurea hydroiodide, tetra-n-propylurea hydrofluoride and tetra-isobutylurea hydrochloride.

Where $R^{12}$, $R^{13}$, $R^{14}$, and $R^{15}$ in the general formula represent aryl, and alkaryl groups, it is intended that only one such substituent be present. Thus in this sub-genus the following are included: 1-naphthylurea hydrobromide, 2-naphthylurea hydrochloride, N-methyl-N'-phenylurea hydrofluoride, N-octyl-N'-naphthylurea hydrobromide, 3,5-xylylurea hydrobromide and phenylurea hydrochloride.

Suitable oxirane compounds to be used as the beginning reactant of this invention include ethylene oxide, cyclohexylethylene oxide, propylene oxide, cyclohexene oxide, 1,2-epoxybutane, 2,3-epoxybutane, cyclopentene oxide, 1,2-epoxyhexane, epoxyisobutylene, 1,2-epoxyhexadecane, styrene oxide, cycloheptene oxide, methylenecyclohexane oxide, and similar compounds having the three-membered oxirane ring.

Suitable thiirane compounds to be used as the starting material for this reaction include ethylene sulfide, propylene sulfide, cyclohexylethylene sulfide, cyclohexene sulfide, 1,2-epithiobutane, 2,3-epithiobutane, cyclopentene sulfide, 1,2-epithiohexane, epithioisobutylene, 1,2-epithiohexadecane, styrene sulfide, cycloheptene sulfide, methylenecyclohexane sulfide, and similar sulfide compounds.

The amount of catalyst or mixtures thereof required to carry out the process of this invention depends somewhat on the reaction conditions, but usually is within the limits of about 0.001 to 10% by weight, based on the amount of oxirane or thiirane reactant. The catalyst concentration will vary as different temperatures, catalysts, contact times and pressures are used. Also, the solubility of the catalyst in a diluent or carrier for the reaction may vary. The catalyst may be dissolved in the oxirane or thiirane reactant, or in a diluent, or it may be placed directly in the reaction zone by suitable means for controlling the amount added. In certain instances it is undesirable to first contact the catalyst with the oxirane or thiirane compound in the absence of the carbon disulfide, because the initial presence of carbon disulfide tends to promote side reactions and decreased yields of the desired glycol carbonates or alkylene carbonates.

This is a type of reaction wherein an induction period is often experienced in starting the reaction, particularly in the absence of a diluent, and this condition may require the use of more catalyst. Induction periods may be reduced by adding to the reactant mass a small amount of the glycol thiocarbonate product.

The reaction is carried out at a temperature of about 200° F. to 500° F. and preferably from about 300° to 450° F., under a pressure of about 100 p.s.i.g. to 1000, or as high as 3000 p.s.i.g. The reaction may be conducted either batchwise or continuously and in the presence or absence of an inert diluent. The catalyst may be continuously introduced in solution form, along with the carbon disulfide and oxirane compound under the desired reaction conditions, into an elongated reaction zone. Under these conditions, the products may be withdrawn from the effluent at the opposite end of the reaction zone. Preferred diluents or solvents for the reaction include dioxane, benzene, and crude glycol thiocarbonates. In using a batchwise operation, portions of the oxirane or thiirane compounds and the catalyst are introduced into a pressure-type reactor, carbon disulfide is introduced in amounts sufficient to build up the desired pressure, and the reaction mixture is agitated during the application of heat. In general, the reaction may be completed in about ½ hour to about 5 hours.

The proportions of oxirane or thiirane compound and carbon disulfide are generally adjusted so as to provide an excess of carbon disulfide over the stoichiometric amount thereof required to react with all of the oxirane or thiirane reactant. The excess carbon disulfide will, in general, vary from about 1% to 300%. In any event, it is necessary to avoid using an excess of oxirane or thiirane compound, since these compounds tend to polymerize under pressures and may create an explosion hazard.

The invention is illustrated by the following specific examples:

*Example I.*—Exactly 0.18 g. of triethylsulfonium iodide, 18.0 g. (0.41 mole) of ethylene oxide (chilled to —20° F.), and 35.0 g. (0.46 mole) of carbon disulfide are charged to an autoclave having a capacity of 100 ml., and which is chilled to —20° F. Then the autoclave is sealed and agitated, by rocking, while the reaction mixture is heated to 400° F. During the heating period the pressure increases to about 600 p.s.i.g. The temperature is maintained at 400° F. for four hours, while continuing agitation, and then the mixture is cooled to room temperature and the pressure is released. The resulting ethylene dithiocarbonate is removed from the autoclave and stripped free of unreacted carbon disulfide, after which it is ready for use in conducting other reactions, analogous to mercaptoethylation processes with monothiocarbonates.

*Example II.*—Exactly 31.0 g. (0.70 mole) of ethylene oxide, 76.7 g. (1.01 moles) of carbon disulfide, and 0.25 g. of triphenylsulfonium iodide (as catalyst) were charged to a chilled autoclave of 300 ml. capacity. The autoclave was sealed and heated to 330–340° F., with stirring. This temperature was maintained for five hours during which time the pressure was approximately 350 p.s.i.g. At the end of the reaction period, the autoclave was allowed to cool and 50 g. of product was removed.

The product was distilled under water-pump vacuum, and three fractions were collected. The first fraction was 21% of the crude product from the autoclave and contained 35% sulfur. From this first fraction a yellow solid was crystallized (using methanol as solvent). This crystalline material represented 29% of the fraction, or 6% of the charge of crude product to the distillation, and appeared to be symmetrical ethylene dithiocarbonate,

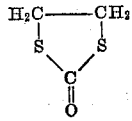

Its melting point was determined to be 28–32° C. Its sulfur content was 52% (against theory of 53%). It was established by infrared analysis to have a carbonyl group present in the molecule.

Two other fractions were collected and both of these were two-phase products. The second fraction (14% of charge) had 85% of a lower phase, which analyzed 48% sulfur, and an upper phase which contained only 1–2% sulfur.

The third fraction (16% of charge) consisted of 80% of a lower phase which analyzed 53% sulfur (theory for ethylene dithiocarbonate); however, the sulfur content of ethylene sulfide is also 53%. The possibility that the material was mostly ethylene sulfide polymer was removed when infrared analyses confirmed the presence of a large content of carbonyl group. Infrared anlysis was inconclusive in an attempt to establish the presence of thiocarbonyl which would imply the presence of some unsymmetrical ethylene dithiocarbonate,

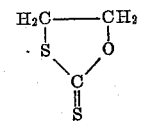

*Example III.*—This experiment was conducted in the same manner as Example II except that no catalyst was employed. In this case, the amount of product was much smaller.

The product of Example III was not analyzed beyond various unsuccessful attempts to crystallize a solid from the liquid product. Yields of the two examples may be compared by considering percent product per quantity of ethylene oxide charged:

| | Percent |
|---|---|
| Example II (with catalyst) | 161 |
| Example III (without catalyst) | 52 |

It may be mentioned that when, by the above consideration, the product is no more than 100%, it is conceivable that it is ethylene oxide polymer.

When an alkylene oxide is reacted with carbon disulfide in accordance with this invention, the resulting dithiocarbonate can be decomposed thermally to yield the corresponding alkylene sulfide and carbon oxysulfide. The thiocarbonates are useful in mercaptoethylation reactions, and overcome previous polymerization difficulties encountered when attempting to utilize ethylene sulfide directly.

When a thiirane compound is used as the reactant with carbon disulfide, in accordance with this invention, the compounds produced are alkylene trithiocarbonates. These end products are useful as organic intermediates, and they may be thermally decomposed to yield the corresponding alkylene sulfide and carbon disulfide. Thus, the end products of this invention are useful as mercaptoethylating agents.

The hydrocarbyl groups $R^1$, $R^2$, $R^3$ and $R^4$ which form part of the oxirane or thiirane compounds used as starting materials have been generally defined as hydrogen, or hydrocarbyl groups containing from 1 to 20 carbon atoms. Specific examples of oxirane and thiirane compounds have been given. Other hydrocarbyl groups may form part of the molecule of the starting oxirane or thiirane compounds as illustrated by the following examples:

2,3-epoxyisopentane,
2,3-dimethyl-2,3-epoxybutane,
2-methyl-2,3-epoxybutane,
2,3-epoxyhexane,
1,2-epoxypentane,
2-propyl-1,2,-epoxypentane,
4,5-epoxyoctane,
4-propyl-4,5-epoxyoctane,
4,5-dipropyl-4,5-epoxyoctane,
5-isopropyl-2,3-epoxydecane,
2,5-dimethyl-3,4-epoxyhexane,
2-methyl-4-isopropyl-3,4-epoxyhexane,
2,5-dimethyl-3,4-diisopropyl-3,4-epoxyhexane,
2-methyl-1,2-epoxybutane,
2,3-epoxypentane-2-methyl-2,3-epoxypentane, 2-ethyl-2,3-epoxypentane,
2,3-dimethyl-2,3-epoxypentane,
3-ethyl-2,3-epoxypentane,
3-methyl-3,4-epoxyhexane,
3-methyl-4-ethyl-3,4-epoxyhexane,
3,4-diethyl-3,4-epoxyhexane,
2-ethyl-1,2-epoxypentane,
4-ethyl-3,4-epoxyheptane,
2,3-diethyl-3,4-epoxyheptane,
3,4-diethyl-3,4-epoxyheptane,
2,3-diethyl-1,2-epoxybutane,
1,2-epoxyeicosane,
1,2-epoxynonadecane,
1,2-epoxyoctadecane,
1,2-epoxyheptadecane,
3,4-epoxyhexadecane,
2-hexyl-1,2-epoxyeicosane,
3-hexyl-1,2-epoxyeicosane,
2-propyl-1,2-epoxyeicosane,
3-octyl-1,2-epoxyeicosane,
3-nonyl-1,2-epoxyeicosane,
1,2-epoxydocosane, and
3-octyl-1,2-epoxydocosane.
2,3-epithioisopentane,
3,4-epithiopentane,
2,3-dimethyl-2,3-epithiobutane,
2-methyl-2,3-epithiobutane,
2,3-epithiohexane,
1,2-epithiopentane,
2-methyl-1,2-epithiopentane,
4,5-epithiooctane,
4-propyl-4,5-epithiooctane,
4,5-dipropyl-4,5-epithiooctane,
5-isopropyl-2,3-epithiodecane,
2,5-dimethyl-3,4-epithiohexane,
2-methyl-4-isopropyl-3,4-epithiohexane,
2,5-dimethyl-3,4-diisopropyl-3,4-epithiohexane,
2-methyl-1,2-epithiobutane,
2,3-epithiopentane,
2-methyl-2,3-epithiopentane,
3-methyl-2,3-epithiopentane,
2,3-dimethyl-2,3-epithiopentane,
3-ethyl-2,3-epithiopentane,
3-methyl-3,4-epithiohexane,
3-methyl-4-ethyl-3,4-epithiohexane,
3,4-diethyl-3,4-epithiohexane,
2-ethyl-1,2-epithiobutane,
4-ethyl-3,4-epithioheptane,
3,4-diethyl-3,4-epithioheptane,
3,4-diethyl-3,4-epithiobutane,
1,2-epitthioeicosane,
1,2-epithiononadecane,
1,2-epithiooctadecane,
1,2-epithioheptadecane,
4,5-epithiohexadecane,
2-hexyl-1,2-epithioeicosane,
3-hexyl-1,2-epithioeicosane,
2-propyl-1,2-epithioeicosane,
3-octyl-1,2-epithioeicosane,
3-nonyl-1,2-epithioeicosane,
1,2-epithiodocosane and
3-octyl-1,2-epithiodocosane.

The following additional examples are given:

*Example IV.*—The process of Example I is repeated using cyclohexylethylene oxide and carbon disulfide as reactants, and tetraphenylphosphonium bromide as the catalyst. Cyclohexylethylene dithiocarbonate is separated as the product.

*Example V.*—In accordance with Example I, styrene oxide is reacted with carbon disulfide in the presence of N,N-dimethylurea hydrochloride as the catalyst. Styrene dithiocarbonate is separated as the product.

*Example VI.*—In accordance with Example II, cycloheptene oxide and carbon disulfide are reacted in the presence of tetramethylphosphonium bromide, and cycloheptene dithiocarbonate is separated as a product.

*Example VII.*—The process of Example I is repeated using cyclohexylethylene sulfide and carbon disulfide as the reactants, and N,N-dimethylurea hydrobromide as the catalyst. Cyclohexyl-ethylene trithiocarbonate is separated as the product.

*Example VIII.*—In accordance with Example I, styrene sulfide is reacted with carbon disulfide in the presence of tetraphenylphosphonium bromide as the catalyst. Styrene trithiocarbonate is separated as the product.

*Example IX.*—In accordance with Example II, cycloheptene sulfide and carbon disulfide are reacted in the presence of tetramethylphosphonium bromide, and cycloheptene trithiocarbonate is separated as a product.

*Example X.*—The procedure of Example II is followed by reacting 3-hexyl-1,2-epithioeicosane with carbon disulfide in the presence of urea. No appreciable reaction results.

*Example XI.*—The procedure of Example II is followed by reacting 3-hexyl-1,2-epithioeicosane with carbon disulfide in the presence of hydrochloric acid. No appreciable reaction results.

*Example XII.*—The procedure outlined in Example II is followed by reacting 3-hexyl-1,2-epithioeicosane with carbon disulfide in the presence of N,N'methyethylurea hydrochloride. 3-hexyl-1,2-eicosane trithiocarbonate is separated as a product.

Referring to the sulfonium salts to be used as catalysts in this reaction, a sub-group under the definition given herein would comprise those in which the $R^5$, $R^6$ and $R^7$ radicals are the same or different radicals selected from the group of saturated alkyl, aryl, alkylaryl, and arylalkyl radicals in which the alkyl substituent is saturated. The organic phosphonium compounds use as catalysts likewise may be defined as a sub-group wherein the $R^8$, $R^9$, $R^{10}$, and $R^{11}$ are the same or different radicals selected from the group of saturated alkyl, aryl, alkylaryl, and arylalkyl wherein the alkyl substituent is saturated. Similarly, the oxonium salts (or urea salts) may be defined as a sub-group wherein $R^{12}$, $R^{13}$, $R^{14}$, and $R^{15}$ are the same or different substituents selected from the group of hydrogen, saturated alkyl, aryl, alkylaryl, and arylalkyl radicals with the restrictions thereto aforementioned. Suitable hydrocarbyl radicals for the oxonium salts would include, in addition to the specific example so far given, heptyl, 3,5-xylyl, 2,6-xylyl, 2,4-xylyl, methylphenyl, ethylphenyl, propylphenyl, butylphenyl, isobutylphenyl, etc., wherein the alkyl groups are in ortho, meta and para positions in relation to the phenyl-nitrogen bond; methylnaphthyl, ethylnaphthyl, propylnaphthyl, butylnaphtyl, etc., where the naphthyl-nitrogen bond is in the 1 or 2 position, and the substituent group is in one of the remaining open positions; phenylmethyl (benzyl), phenylethyl, phenylbutyl, phenylhexyl, phenyldecyl, etc., wherein the phenyl group is attached to the 1–10 carbon atom of the alkyl group; and combinations thereof.

Suitable hpdrocarbyl radicals for the organic phosphonium compounds include, in addition to those already disclosed, isopropyl, butyl, isobutyl, amyl, pentyl, hexyl, octyl, nonyl and decyl groups, methylphenyl, ethylphenyl, propylphenyl, butylphenyl, amylphenyl, hexylphenyl, heptylphenyl, octylphenyl, etc., where the alkyl substituent on the phenyl radical is ortho, meta or para in relation to the phenylphosphorus bond; methylnaphthyl, ethylnaphthyl, propylnaphthyl, butylnaphthyl, etc., where the naphthyl-phosphorus bond is in the 1 or 2 position and the substituent group is in one of the remaining open positions; and phenylmethyl (benzyl), phenylethyl, phenylpropyl, phenylbutyl, phenyldecyl, etc., wherein the phenyl group is attached to the 1-10 carbon atom in the alkyl group.

Having thus described the invention, the only limitations attaching thereto appear in the appended claims.

The embodiments of the inventions in which an exclusive property or privilege is claimed are defined as follows:

1. The process of producing symmetrical dithiocarbonates of the formula

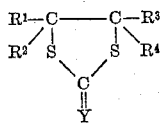

wherein Y is an element of the group consisting of oxygen and sulfur, $R^1$, $R^2$, $R^3$ and $R^4$ are members of the group consisting of hydrogen, alkyl having 1 to 20 carbon atoms, phenyl, cycloparaffinic having 5 to 7 carbon atoms, cycloparaffinic of 5 to 7 carbon atoms formed by joining $R^1$ and $R^3$ and cycloparaffinic of 5 to 7 carbon atoms formed by joining $R^3$ and $R^4$ which comprises reacting a compound of the formula

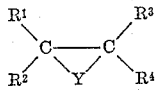

wherein $R^1$, $R^2$, $R^3$, $R^4$ and Y are as above-defined, with a stoichiometric excess of carbon disulfide at a termperature of about 200° to 500° F. in the presence of a catalytic amount of an organic onium compound of the group consisting of (1) Organic sulfonium halides of the formula

wherein $R^5$, $R^6$ and $R^7$ are members of the group consisting of methyl, ethyl, phenyl, and tolyl and X is a halogen, (2) organic phosphonium halides of the formula

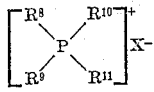

wherein $R^8$, $R^9$, $R^{10}$ and $R^{11}$ are members of the group consisting of alkyl, aryl, alkaryl, aralkyl having 1 to 20 carbon atoms and X is a halogen and (3) organic oxonium halides of the formula

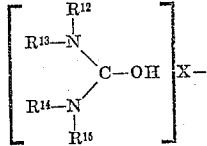

wherein $R^{12}$, $R^{13}$, $R^{14}$ and $R^{15}$ are members of the group consisting of hydrogen, alkyl, aryl, alkaryl and aralkyl having 1 to 10 carbon atoms, and no more than one of said members is aryl and alkaryl and X is a halogen.

2. The process is accordance with claim 1 in which said catalyst is an organic sulfonium halide of Formula 1.

3. The process in accordance with claim 1 in which said catalyst is an organic sulfonium halide of Formula 1, wherein $R^5$, $R^6$, and $R^7$ are ethyl and X is iodine.

4. The process in accordance with claim 1 in which said catalyst is an organic sulfonium halide of Formula 1, wherein $R^5$, $R^6$ and $R^7$ are phenyl and X is iodine.

5. The process in accordance with claim 1 in which said catalyst is an organic phosphonium halide of Formula 2.

6. The process is accordance with claim 1 in which said catalyst is an organic phosphonium halide of Formula 2, wherein $R^8$, $R^9$, $R^{10}$ and $R^{11}$ are methyl and X is bromine.

7. The process in accordance with claim 1 in which said catalyst is an organic phosphonium halide of Formula 2 where $R^8$, $R^9$, $R^{10}$ and $R^{11}$ are phenyl and X is bromine.

8. The process in accordance with claim 1 in which said catalyst is an organic oxonium halide of Formula 3.

9. The process is accordance with claim 1 in which said catalyst is an organic oxonium halide of Formula 3, in which $R^{12}$, $R^{13}$, $R^{14}$ and $R^{15}$ are hydrogen and X is chlorine.

10. The process of producing ethylene dithiocarbonate which comprises reacting ethylene oxide with a stoichiometric excess of carbon disulfide at a temperature of about 400° F. in the presence of a catalytic amount of triethylsulfonium iodide.

11. The process of producing ethylene dithiocarbonate which comprises reacting ethylene oxide with a stoichiometric excess of carbon disulfide at a temperature of about 330° to 340° F. in the presence of a catalytic amount of triphenylsulfonium iodide.

References Cited in the file of this patent

Culvenor et al.: Journal of the Chemical Society (London), 1946, pp. 1050–2.